Dec. 2, 1930.  E. E. HARPER  1,783,423
CHEMICAL FEED MACHINE
Filed April 9, 1928  2 Sheets-Sheet 1

INVENTOR.
Elmer E. Harper
BY *Arthur G. Brown*
ATTORNEYS.

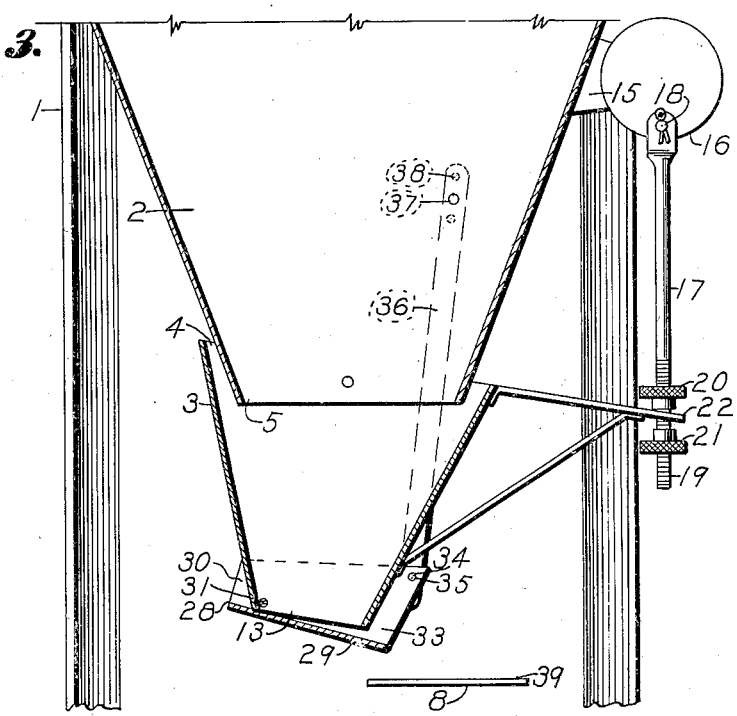
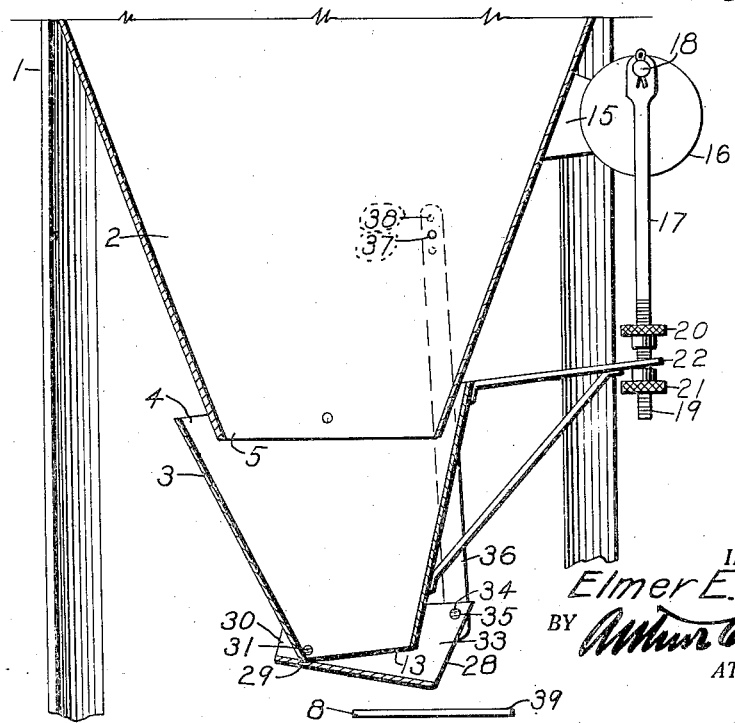

Patented Dec. 2, 1930

1,783,423

UNITED STATES PATENT OFFICE

ELMER E. HARPER, OF KANSAS CITY, MISSOURI

CHEMICAL-FEED MACHINE

Application filed April 9, 1928. Serial No. 268,516.

My invention relates to material feeding devices and has for its principal object to provide a device of this character wherein material may be agitated co-incidently with automatic delivery of the material from the device in measured quantities. Further objects of the invention are to provide a device of this character which is adjustable for feeding materials of various sizes such as powdered or lump substances, and effect agitation of the material by movement of the delivery mechanism.

In accomplishing these and other objects of the invention, I have provided improved details of structure, the preferred forms of which are illustrated in the accompanying drawings, wherein:

Fig. 3 is a vertical longitudinal section of the intermediate portion of the device, illustrating oscillating hoppers in retracted position.

Fig. 4 is a similar view illustrating oscillating members in forward position.

Figure 1:
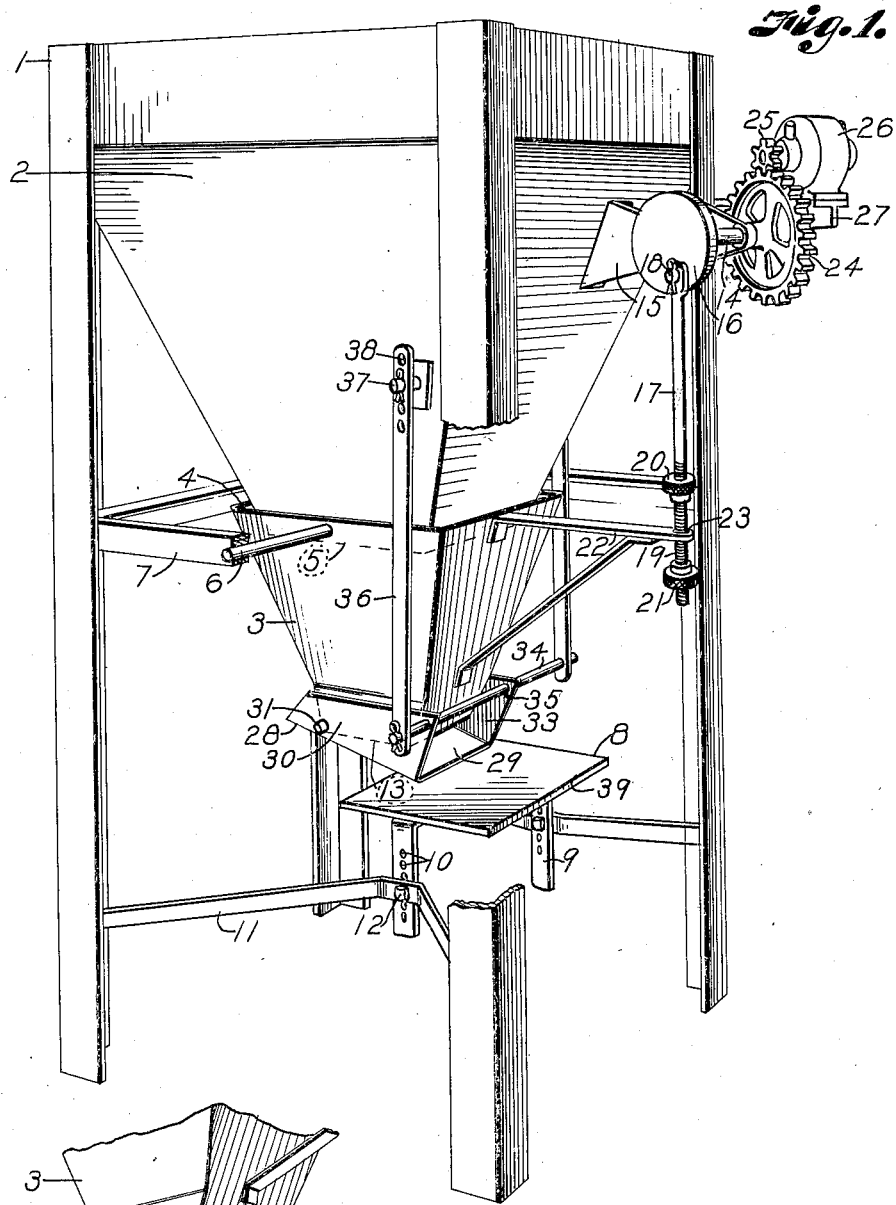
Fig. 1 is a perspective view of a material feeding device constructed in accordance with my invention, a supporting post being broken away to better disclose the structure.
Figure 2:
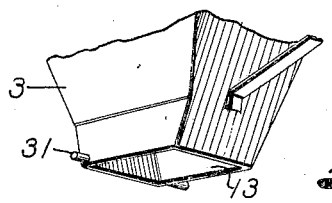
Fig. 2 is a detail perspective view of a delivery hopper and the lower end of a hopper with which it is associated, shown in separated relation.

Referring in detail to the drawings:

1 designates a supporting frame, 2 a storage bin or hopper supported by the frame, 3 an oscillating hopper pivotally supported with the upper edge or periphery of its inlet mouth 4 extending upwardly beyond the lower edge or periphery of the discharge mouth 5 of the storage hopper, the periphery 4 of the oscillating hopper inlet being spaced laterally from the walls of the storage hopper. The oscillating hopper is preferably supported by trunnions 6 journaled in cross members 7 of the frame 1. In the illustrated example, the trunnions are centrally positioned adjacent the upper edge of the oscillating hopper, that is, on the axis of the oscillating hopper, and also on the axis of the storage hopper. A horizontal delivering table or tray 8 is supported adjacent the mouth of the oscillating hopper, the support comprising, for example, depending plates 9 fixed to the under surface of the body and having aligned openings 10, and brackets 11 engaged with the frame 1, bolts 12 extending through suitable openings in the bars 11 and selected openings 10 of the plates 9 whereby the tray may be fixed in suitable spaced relation with the lower edge or mouth 13 of the oscillating hopper.

Means are provided for tilting the oscillating hopper, and are illustrated as including a shaft 14 supported from the frame by a bracket 15, a disk 16 fixed axially to the shaft, and a link 17 pivotally connected to the disk by a pin 18 eccentrically mounted on the disk. The depending lower end 19 of the link is threaded, and spaced nuts 20 and 21 are adjustably positioned on the threaded end. A tilting lever or arm 22 is fixed to the oscillating hopper and has an opening 23 in its outer end for loose mounting on the lower end of the link between the adjustable nuts.

The shaft is provided with a gear 24 meshed with a pinion 25 operated through suitable reduction mechanism 26 from a motor not shown, the operating mechanism being supported on a bracket 27 fixed to the frame. The arm 22 of the oscillating hopper is moved by the link over distances proportionate to the desired arc of movement of the mouth of the hopper 3, the adjustment being made by suitably spacing the nuts 20 and 21. The hopper may deliver material directly to the tray, as later described.

I further preferably interpose a second pivoted hopper 28 between the hopper 3 and the tray, the second hopper being illustrated as a scoop-like delivery member comprising a floor or bottom 29 extending beyond the edges of the mouth of the oscillating hopper 3, and side wings 30 arranged along the sides of the hopper 3 in the direction of the pivotal movement thereof.

The structure provides that oscillation of the oscillating hopper 3 will cause the pivoting of the delivery hopper on its pivotal mounting. Since the said pivotal mounting of the hopper 28 is at one edge of the mouth of the oscillating hopper 3, in the illustrated application of the invention, material will be delivered from the oscillating hopper into the delivery hopper when the mouth of the oscillating hopper moves rearwardly, that is, in a clockwise direction. The bottom 29 of the delivery hopper is maximumly spaced from the edge of the mouth of the oscillating hopper at the forward limit of the pivoting of the members.

Journals 31 which pivotally support the delivery hopper are positioned at one end of the delivery hopper and adjacent the rear edge of the mouth of the oscillating hopper 3, in the illustrated application of the invention. The journals 31 may comprise trunnions fixed to the hopper 3 and extending into openings 32 in the side wings of the delivery hopper adjacent the floor 29, the purpose in this case being to hinge the rear end of the delivery hopper to the rear edge of the mouth of the oscillating hopper. Since the floor 29 substantially engages the rear edge of the upper hopper mouth, the side wings need not be high at the pivoting points. The wings are tapered toward the front end or mouth 33 of the delivery hopper to overlie the sides of the hopper 3 at various stages of pivoting of the hoppers and retain material for outflow through the mouth 33.

The delivery hopper is further supported with its floor in desired relation with the tray and the hopper 3, by means illustrated as connected with the front ends of the wings and comprising preferably a bar 34 extending through aligned openings 35 in the wings, and pivoted links 36 connected with the bars and adjustably supported from fixed pivots 37 illustrated as trunnions extending from the bin. A plurality of openings 38 are provided in the links, for adjustably mounting the links on the supports 37 to support the front end of the delivery hopper in desired relations with the tray and the hopper 3. Forward movement of the lower end of the hopper 3 and the hopper 29 will tend to displace and move material toward the edge 39 of the tray, and cause it to fall therefrom in measured quantities.

A simple form of material feeding device above described comprises a storage bin, an oscillating hopper 3, a tray, and means for actuating the hopper. The position of the tray is adjusted to a desired relation with the mouth of the hopper. In operating such a device, material deposited in the bin and hopper passes through the mouth of the hopper to the tray and is supported thereby. The actuating mechanism is adjusted for the desired speed and amplitude of oscillation of the hopper preferably by suitable reduction gears and adjustment of the nuts on the link. Forward movement of the lower end of the hopper will result in the lifting of the front edge of the mouth and permit material to pass from the hopper to the front portion of the tray, and the hopper will at the same time push a measured quantity of material from the tray. Upon opposite movement, the hopper will push a similar measured quantity from the opposite edge of the tray and discharge material to that portion of the tray. Coincidently with the results mentioned, an upheaval of material in the hopper and bin occurring upon each oscillation of the hopper will loosen and break up the material and prevent packing.

Addition of another pivoted hopper to the structure produces a different mode of operation but with a similar upheaving effect and the delivery of desired measured quantities of material from the tray. A hopper such as the lower delivery hopper 28 illustrated in the drawings may be suitably supported and pivoted for delivering material to the rear or front portion of the tray or both portions.

The drawings illustrate the hopper 28 as pivoted at its rear end to one edge of the mouth of the hopper 3 with its front end adjustably supported from the bin, for delivery of material from the front edge 39 of the tray. The front support is adjusted to space the mouth of the hopper 28 suitably from the front edge of the hopper 3 for regulating the amount of material that may pass from the hopper 3 on each oscillation thereof.

Material in the bin and hopper 3 is supported from the delivery hopper 28 and passes from the delivery hopper to the tray. During forward, that is anti-clockwise, oscillation of the hopper 3, the delivery hopper moves forwardly, material on the tray is pushed forward the front edge of the tray, and a measured quantity is pushed from the tray. The forward movement spaces the mouth of the delivery hopper from the front edge of the hopper 3, and a slight amount of material passes from the hopper 3 to the delivery hopper and to the tray. Pressure due to the changing relation between the bin and the hoppers causes an upheaving effect on the material in the bin and hopper 3.

Opposite tilting of the hopper 3, retracting the mouth of the hopper 3 and the delivery hopper 28, causes the floor of a delivery hopper to approach the mouth of the hopper 3. During the retractive movement, material moves through the front portion of the mouth of the hopper 3 into the lower hopper; and, as the lower hopper moves rearwardly, material passes from the lower hopper to the tray. The approach of the floor of the delivery hopper to the mouth of the hopper 3 causes a pronounced upheavel of material in the hoppers and bin, the upheaving effect combining with the downward movement of portions of the material passing from the hopper 3 and hopper 28 to produce complex disturbance and movement of the material, for loosening the material and preventing packing thereof and promoting free flow.

The amplitude and the speed of oscillation of the hopper 3 may be varied by adjustment of the spaced nuts on the link, and of the gears, thereby providing a wide range in the amount of material delivered to the delivery hopper or to the tray if the delivery hopper is omitted from a particular embodiment of the device.

The changes in oscillation of the intermediate hopper also vary the degree of delivery by the delivery hopper 28, both by limiting the spacing of the floor 29 from the mouth of the oscillating hopper and also by limiting the movement of the delivery hopper over the tray. The tray may be adjusted in relation with the hoppers, both for accommodating the tray to a shorter arc of travel of the hoppers and also to provide for a smaller mass of material piled thereon which must be moved by material impelled by the oscillating hoppers.

It is apparent, therefore, that a device of this nature may be adjusted to handle material comprising large units such as crushed stone and smaller material such as pulverized substances, and that measured quantities of material may be delivered from the tray in widely varying amounts. Different machines may, of course, be provided for specific purposes and for handling extraordinary quantities, either very small or very large, and batteries of the machines may be provided whereby very large quantities may be handled over a long period without replenishment of the storage.

What I claim and desire to secure by Letters Patent is:

1. In a material feeding machine, a bin, a pivoted hopper for receiving material from the bin, and means for upheaving material contained in the hopper including means for pivotally moving said hopper.

2. In a material feeding machine, a plurality of connected hoppers, means for supporting material in the hoppers, means supporting the hoppers, and means for delivering supported material from the hoppers including means for pivotally moving one of the hoppers in relation to said material-supporting means.

3. In a material feeding machine, a bin, a pivotally supported hopper receiving material from the bin, means for receiving material issuing from the hopper adapted to support received material, and means for oscillating the hopper to displace supported material.

4. In a material feeding machine, a storage bin having an open bottom, a pivoted, downwardly discharging hopper receiving material from the bin, means separate from the hopper for supporting material contained in the bin and hopper, and means for oscillating the hopper, said hopper being adapted upon oscillation thereof to cause delivery of material from and upheaval of material within the hopper.

5. In a material feeding machine, a bin having gravity discharge, a hopper movably supported for receiving material from the bin, a tray for receiving material from the hopper, and means for moving the hopper to cause measured delivery of material to the tray, said means being adapted to push a measured quantity of material off the tray.

6. In a material feeding machine, a bin, a movable hopper for receiving material from the bin, a tray for receiving material from the hopper and in spaced relation with the outlet thereof, and means adapted to upheave material in the hopper including means for moving material from the tray, said means including means for moving the hopper.

7. In a material feeding device, a bin, having an outlet in its bottom, a hopper pivotally supported below the bin and having its upper end extending above the outlet of the bin, a tray positioned adjacent the mouth of the hopper and in spaced relation therewith for restraining material in the hopper, and means for tilting the hopper to permit gravity movement of material from the hopper to the tray and to move material over the tray, said tray restraining material to cause upheaval of material in the hopper upon tilting thereof.

8. In a material feeding device, a bin having gravity discharge, a hopper supported pivotally below the bin and having its upper periphery positioned above the outlet of the bin and spaced from the walls thereof, a tray positioned adjacent the mouth of the hopper and in spaced relation therewith for receiving material from the hopper and supporting material contained in the bin and hopper, and means for pivotally moving the hopper for displacing material on the tray and for delivery thereof from the tray.

9. In a material feeding device, a hopper having gravity discharge, a second hopper supported pivotally below the first hopper having its upper margin positioned above the outlet of the first hopper, a fixed tray adjacent the outlet of the second hopper and in spaced relation therewith for restraining movement of material from the second hopper, and means for pivoting the second hopper to upheave restrained material and relieve restraint of a portion of the material for outflow to the tray.

10. In a material feeding device, a support, a storage hopper, an oscillating hopper having its inlet above the outlet of the storage hopper and pivotally supported at points adjacent the mouth of the storage hopper and the upper edge of the oscillating hopper, a delivery hopper pivotally supported on pivots having axes parallel with the pivotal support of the oscillating hopper and a mouth adjacent one edge of the oscillating hopper, and a delivery tray supported adjacent the delivery hopper, the delivery edge of the tray being spaced from the adjacent portion of the arc of movement of the delivery hopper.

11. In a material feeding device, a support, a storage hopper, an oscillating hopper pivotally supported adjacent the mouth of the storage hopper, a delivery hopper pivotally supported at one end by the oscillating hopper and having a mouth opposite to said pivotal mounting, a tray supported adjacent the delivery hopper for restraining flow of material therefrom, and means for swinging the oscillating hopper to cause pivotal movement of the delivery hopper for upheaving material in the hoppers and delivering material from the tray.

12. In a material feeding device, a storage hopper, an oscillating hopper having an inlet overlying the mouth of the storage hopper, a delivery scoop pivotally mounted on the edge of the mouth portion of the oscillating hopper and extending across said mouth, pivotal means supporting the edge of the delivery scoop opposite the pivotal mounting, and a tray for receiving material from the delivery scoop and over which the scoop travels upon oscillation of the oscillating hopper for depositing material on the tray and pushing material off the tray.

13. In a material feeding device, a storage bin, an oscillating hopper overlying the mouth of the bin, a delivery scoop pivotally mounted adjacent the edge of the mouth portion of the oscillating hooper, adjustable pivotal means supporting the edge of the delivery scoop opposite the pivotal mounting for pivoting of the scoop upon oscillation of the hopper, and a tray for receiving material from the delivery scoop and over which the pivoting scoop travels upon oscillation of the oscillating hopper to discharge material to the tray for moving measured amounts of material from the tray.

14. In apparatus of the character described, a material containing member having a hooper opening in its bottom, and a feeding member mounted for vertical rocking movement beneath said opening to receive material therefrom and having a lateral opening whereby material is discharged through said opening in response to downward movements of the feeding member and material upheaved in the containing member in response to upward movements of said feeding member.

15. In apparatus of the character described, a material containing member having a discharge opening, a feeding member pivotally suspended from the containing member beneath said opening and having lateral outlet, and means for rocking the feeding member whereby material delivered from the containing member into the feeding member is discharged in response to downward movement of the feeding member and material upheaved in the containing member in response to upward movements of the feeding member.

16. In apparatus of the character described, an oscillating material containing member having a discharge opening, a feeding member pivotally suspended from the containing member beneath said opening and having lateral outlet, and means for rocking the feeding member in response to oscillations of the containing member whereby material delivered from the containing member into the feeding member is discharged in response to downward movement of the feeding member and material upheaved in the containing member in response to upward movements of the feeding member.

17. Apparatus of the character described including a hopper and a pivotal hopper adapted to receive material from the first named hopper and support material in the first named hopper, said pivotal hopper having pivotal support eccentric to the axis of the first named hopper for upheaving material in the hoppers in response to swinging movement of the pivotal hopper.

In testimony whereof I affix my signature.

ELMER E. HARPER.